US012618430B2

(12) United States Patent
Byrne et al.

(10) Patent No.: US 12,618,430 B2
(45) Date of Patent: May 5, 2026

(54) UNITARY PIECE DUAL LOCK SPLIT WASHER

(71) Applicant: Woodside Energy Technologies Pty Ltd, Perth (AU)

(72) Inventors: Timothy Adam Byrne, Nickol (AU); Henry Smith, Victoria Park (AU)

(73) Assignee: Woodside Energy Technologies Pty Ltd, Perth (AU)

( * ) Notice: Subject to any disclaimer, the term of this patent is extended or adjusted under 35 U.S.C. 154(b) by 119 days.

(21) Appl. No.: 18/081,313

(22) Filed: Dec. 14, 2022

(65) Prior Publication Data

US 2023/0119094 A1     Apr. 20, 2023

Related U.S. Application Data

(63) Continuation of application No. PCT/AU2021/050610, filed on Jun. 15, 2021.

(30) Foreign Application Priority Data

Jun. 15, 2020   (AU) ................................. 2020901978

(51) Int. Cl.
F16B 43/00          (2006.01)
(52) U.S. Cl.
CPC .................................. F16B 43/005 (2013.01)
(58) Field of Classification Search
CPC .......... F16B 39/10; F16B 39/24; F16B 43/00; F16B 43/005; F16B 43/006
USPC .......................... 411/531, 532, 539, 540, 541
See application file for complete search history.

(56) References Cited

U.S. PATENT DOCUMENTS

| | | | | |
|---|---|---|---|---|
| 1,191,565 A | * | 7/1916 | Chambers ............. | F16B 43/007 |
| | | | | 411/539 |
| 1,450,014 A | * | 3/1923 | Berglof ................. | F16B 43/006 |
| | | | | 301/68 |
| 1,492,561 A | * | 5/1924 | Gabriel ................. | F16B 43/007 |
| | | | | 411/536 |
| 1,558,364 A | * | 10/1925 | Iverson ................... | F16B 21/16 |
| | | | | 301/38.1 |

(Continued)

FOREIGN PATENT DOCUMENTS

| | | |
|---|---|---|
| AU | 2019/100858 A4 | 9/2019 |
| CN | 205956610 U | 2/2017 |
| WO | 2004/007853 A2 | 1/2004 |

OTHER PUBLICATIONS

International Search Report and Written Opinion in counterpart International Application No. PCT/AU2021/050610, mailed Sep. 2, 2021, 12 pages.

*Primary Examiner* — Flemming Saether
(74) *Attorney, Agent, or Firm* — Edell, Shapiro & Finnan, LLC

(57) ABSTRACT

A washer includes a single piece body made of a resilient and flexible material and having a split extending between an inner circumferential edge and a radially outer peripheral edge to provide the body with first and second ends. One end has circumferentially extending and radially spaced fingers, and the other end has circumferentially extending and radially spaced fingers. A joint structure is integrally formed with the first and second ends. The joint structure includes a first locking mechanism and a second locking mechanism. The second locking mechanism is only engageable after the first locking mechanism is fully engaged.

17 Claims, 4 Drawing Sheets

(56)        References Cited

U.S. PATENT DOCUMENTS

| | | | | | |
|---|---|---|---|---|---|
| 1,777,614 | A | * | 10/1930 | Hauger | F16B 21/16 411/540 |
| 3,807,885 | A | * | 4/1974 | Coski | F16B 21/186 403/282 |
| 3,913,187 | A | * | 10/1975 | Okuda | F16L 3/1075 24/484 |
| 4,502,186 | A | * | 3/1985 | Clarke | F16L 33/035 24/16 PB |
| 4,557,024 | A | * | 12/1985 | Roberts | F16L 33/035 24/23 EE |
| 5,024,405 | A | * | 6/1991 | McGuire | F16L 3/12 248/74.1 |
| 5,148,576 | A | * | 9/1992 | Dyer | F16L 33/035 24/20 R |
| 5,653,411 | A | * | 8/1997 | Picco | F16L 3/2235 24/339 |
| 6,164,605 | A | * | 12/2000 | Drake | F16L 3/1075 24/339 |
| 6,488,461 | B1 | * | 12/2002 | Zacharias | F16B 43/007 411/539 |
| 7,178,203 | B2 | * | 2/2007 | Pearson | F16L 3/137 248/74.3 |
| 7,284,302 | B2 | * | 10/2007 | Lares | F16L 33/035 248/74.3 |
| 10,544,820 | B2 | | 1/2020 | Fujihara et al. | |
| 10,982,795 | B2 | * | 4/2021 | Tally | F16L 3/222 |
| 2004/0208727 | A1 | | 10/2004 | Magagna | |
| 2004/0208729 | A1 | | 10/2004 | Underwood et al. | |
| 2010/0253064 | A1 | | 10/2010 | Le Ruere | |
| 2020/0006932 | A1 | | 1/2020 | Monteil et al. | |

* cited by examiner

UNITARY PIECE DUAL LOCK SPLIT WASHER

CROSS-REFERENCE TO RELATED APPLICATIONS

This application is a continuation of International Application No. PCT/AU2021/050610, filed Jun. 15, 2021, which claims priority from Australian Patent Application No. 2020901978, filed Jun. 15, 2020, the entire disclosures of which are incorporated herein by reference.

TECHNICAL FIELD

A unitary piece dual lock split washer is disclosed. The split washer has particular, but not exclusive, application for providing ingress protection ("IP") at an electrical termination.

BACKGROUND ART

It is common to fit a washer between a fastener and an article to which the fastener is fastened. One example of this is at an electrical termination where a cable passes through a cable gland that is mechanically coupled to a wall of a junction box. The electrical cable passes through the cable gland and enters the junction box where it may be connected to a terminal post or another cable. The cable gland may have a threaded connection to a wall of the junction box; or alternately the gland may pass through an unthreaded hole in the wall of the junction box and fixed in place by a lock nut inside the junction box. In either case the purpose of the washer is to help in protecting against water and/or dust ingress from about the gland at the termination into the electrical equipment, junction box or the like.

For the purposes of compliance with safety and environmental regulations, equipment and assemblies may need to meet a prescribed ingress protection (IP) rating. The rating is designated as "IP XY" where X is an integer between 0 and 6 designating a solids (e.g., dust) ingress protection rating, and Y is an integer between 0 and 8 designating a liquids ingress protection rating.

Examples of equipment that may have an IP rating include: an electrical junction box; a cable gland; and an interface between a cable gland and a junction box. It may be important for a junction box that is exposed to the environment to have a specific IP rating for water ingress protection. As an example, the junction box may need an IP rating of IP X8. For a junction box to meet this rating it must be able to endure a 30-minute period under 1 m of water without ingress of water.

For a junction box its IP rating will be dependent on various aspects including: the inherent construction of the junction box; the nature of associated cable glands that pass into the junction box; and the washer between the cable gland and a wall of the junction box. Thus, the overall IP rating may be affected by the performance of, among other things, a washer.

A major issue with replacing a washer at an electrical termination of a cable is the need to mechanically disconnect the cable and the cable gland to remove an old washer and fit a new one. Additionally, for a junction box or cable that carries any reasonable current or voltage, in order to comply with safety regulations, it may be necessary to electrically isolate and/or de-energise the junction box. This means a simple job can have significant cost implications due to: the time to open a junction box, mechanically disconnect the cable and cable gland, and subsequently reconnect, seal and close the junction box; and, the consequential shut down of electrical equipment which is connected with the junction box. That is, not only is there the cost of the time of technicians to perform the washer replacement task there is also downtime in production due to the need to shut down electrical power.

The above references are not intended to limit the application of the unitary piece dual lock split washer as disclosed herein.

SUMMARY OF THE DISCLOSURE

In a first aspect there is disclosed a unitary piece dual lock split washer comprising:

a single piece body made of a resilient and flexible material, the body having an inner circumferential edge, a radially outer peripheral edge and a split extending between the inner and out edges to provide the body with first and second ends; and a joint structure integrally formed with the first and second ends, the joint structure having an engaged state wherein the first and second ends mutually engage each other to form a substantial seal across the split, and a disengaged state wherein the first and second ends can be moved apart to create an opening of a variable size and shape in the body to enable the washer to be fitted about a member, the joint structure having a first locking mechanism and a second locking mechanism each locking mechanism having respective parts on the first and second ends and wherein the parts of the second locking mechanism are only engageable after the parts of the first locking mechanism are fully engaged.

In one embodiment the joint mechanism comprises two radially spaced fingers extending circumferentially from the first end and two radially spaced fingers extending circumferentially from the second end and wherein when in the engaged state one finger of each end fits between the radially spaced two fingers of the other end.

In one embodiment the first locking mechanism has a first part on a first of fingers extending from the first end and a second part on one a first of the fingers extending from the second end.

In one embodiment a first part of the second locking mechanism is carried on a second of the fingers extending from the first end.

In one embodiment a second part of the second locking mechanism in on the first finger extending from the second end.

In one embodiment one of the first and second parts of the second locking mechanism is a protrusion extending in a generally radial direction and another other of the first and second parts of the second locking mechanism is a recess for receiving the protrusion.

In one embodiment the first part of the second locking mechanism is the protrusion and the protrusion is on the second finger extending from the first end.

In one embodiment the protrusion is arranged to: bear against the first finger extending from the second end and flex in a generally radial outward direction prior to the first locking mechanism becoming fully engaged while the first and second ends are being moved toward each other; and, be in radial alignment with the second part of the second locking mechanism wherein the second finger extending from the first end is capable of flexing in a generally radial inward direction to engage with the second part of the second locking mechanism when the first locking mechanism is fully engaged.

In one embodiment the first part of the first locking mechanism comprises at least one engaging portion, and the second part of the first locking mechanism comprises at least one complementary engaging portion.

In one embodiment the least one engaging portion comprises a first plurality of teeth, and each of the at least one complementary engaging portion comprises a second plurality of teeth.

In one embodiment the washer comprises opposite first and second parallel radial planar faces wherein opposite sides of the body and the joint structure lie on respective ones of the parallel radial planar faces.

In one embodiment when the first and second locking mechanism are engaged, the inner circumferential edge has a substantially constant radius Ri and the radially outer peripheral edge has a compound shape of a portion of a circle and a radially extending tab having opposite radial edges which reach to an arcuate edge.

In one embodiment the split follows a winding path through the tab from the inner circumferential edge to the arcuate edge of the tab.

In one embodiment the portion of the circle of the radially outer peripheral edge extends with a constant radius Ro for between about 260°-300°, and the tab extends circumferentially for between about 60°-100°.

In one embodiment the body is made from a natural or synthetic rubber including a thermoplastic elastomer.

In a second aspect there is disclosed method of installing a washer between a cable gland a junction box or other device to which the cable gland is engaged, the method comprising:
loosening the cable gland from the junction box or other device to create a gap between a face of the cable gland and the junction box or other device while the cable gland remains engaged with the junction box or other device; disengaging ends of the washer to form an opening; inserting the washer in a generally radial direction onto the cable gland via the opening; engaging the ends of the washer; and tightening the cable gland to compress the washer and form a seal between the cable gland and the junction box or other device.

In one embodiment inserting the washer comprises inserting a split washer in accordance with the first aspect.

BRIEF DESCRIPTION OF THE DRAWINGS

Notwithstanding any other forms which may fall within the scope of the washer set forth in the Summary, specific embodiments will now be described by way of example only with reference to the accompanying drawings in which.

DESCRIPTION OF SPECIFIC EMBODIMENT

Figure 1:
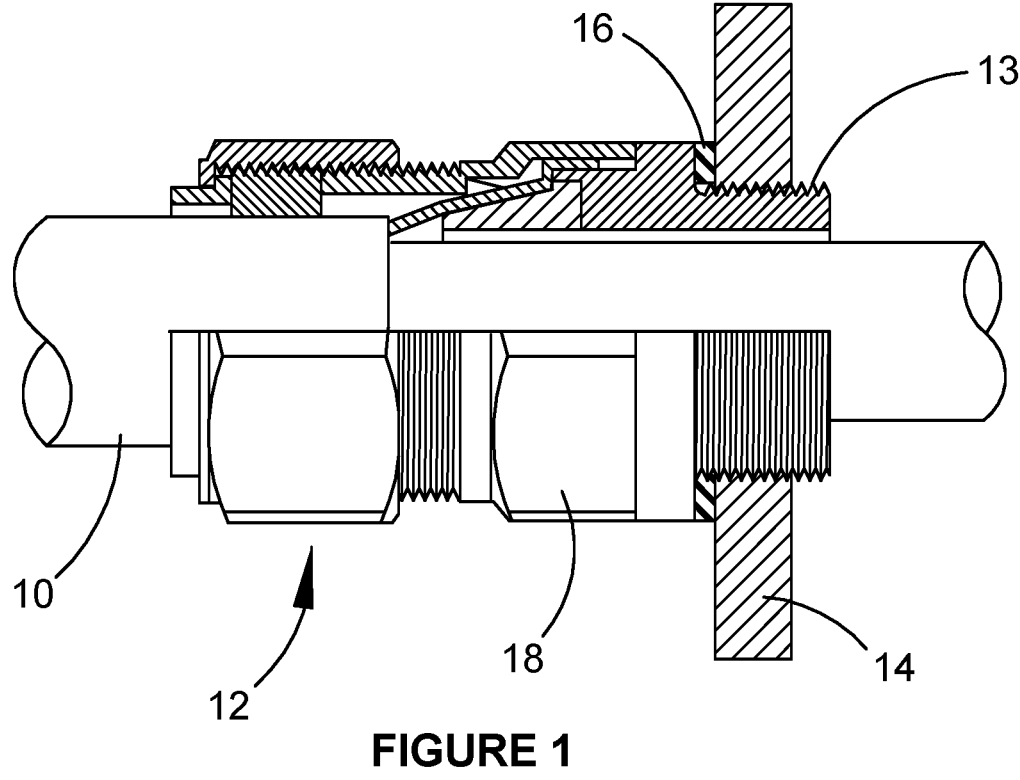
FIG. 1 depicts one form of an electrical termination and a prior art washer that may is be used when connecting with a junction box.

To provide context to the disclosed split washer, reference is made to a prior art arrangement for terminating an electrical cable 10 in a junction box (not shown) as depicted in FIG. 1.

The cable 10 is supported in a gland 12 which has a threaded end 13 to facilitate connection to and through a wall 14 of the junction box. A prior art washer 16 is compressed between the gland and the wall 14, by a nut 18. The purpose of the washer 16 is to prevent ingress of foreign matter into the junction box. Of most concern is ingress of water or other liquid as this may cause shorting of the electrical conductors or connections inside the junction box. The washer 16 is in the form of an endless annulus and maybe made from various materials including fibre or rubber.

Junction boxes, at least in industrial use, are often subjected to scheduled inspection and maintenance. In the absence of an earlier detected issue, it is at this time that a is decision may be made to replace one or more of the washers associated with the junction box.

For an electrical conductor terminating inside a junction box, this will require isolation of the cable, disconnection of the cable from a terminal inside the junction box and unscrewing of the gland 12 from the wall 14.

Figure 2:
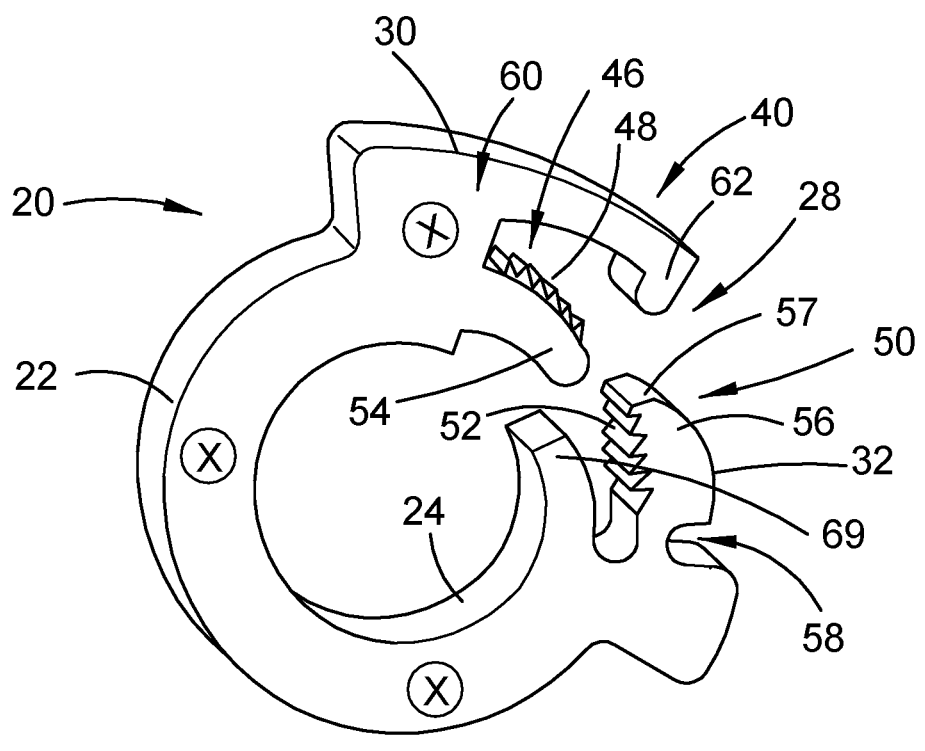
FIG. 2 is a representation of one embodiment of the disclosed washer in an opened and a disengaged state, forming an opening allowing the washer to be fitted onto or removed from an article such as a cable gland.

FIGS. 2-6 show one embodiment of the disclosed unitary piece split washer 20 in various stages of closing. In FIG. 2 the washer 20 is in a disengaged and opened state with opposite ends being skewed apart for insertion onto a cable gland or other article. When in this state the washer 20 can be fitted onto a for example a cable gland in a radial direction. For this reason, it is not necessary to unscrew or completely disconnect the cable gland to fit the split washer 20. In contrast for the prior art washer 16, the washer is fitted in an axial direction with reference to the gland 12/cable 16. This can only be done by completely removing the cable 16 and gland 12 form the junction box.

The washer 20 comprises a single (i.e., one) piece body 22 made of a resilient and flexible material. As most clearly seen in FIG. 6 the body has an inner circumferential edge 24, an outer peripheral edge 26, and a split or cut line 28 (shown by a white phantom line), extending between the inner circumferential edge 24 and the outer peripheral edge 26 and wholly through the thickness of the washer 20. Because of the split 28, the body has a first end 30 and a second end 32. The ends 30 and 32 can be disengaged and separated to fit the washer onto, or remove the washer from, a cable gland or other article.

When the washer 20 is fully closed and engaged, the inner circumferential edge 24 is of a circular shape having a radius Ri. The outer peripheral edge 26 has a compound shape of a circle of an outer radius Ro and a laterally extending tab 34 having opposite radial edges 36 which reach to an arcuate edge 38. The outer peripheral edge extends with the radius Ro between about 260°-300°. The tab 34 may extend circumferentially for between about 60°-100°. The split 28 runs through the tab 34. More specifically the split 28 follows a winding or tortuous path between the inner circumferential edge 24 and the outer peripheral edge 26. With reference to a radius of the washer 20 the is split 28 winds over or crosses itself three times as shown for example along radius Ra.

The washer 20 includes a joint structure 40 integrally formed with the first and second ends 30, 32. The joint structure 40 has an engaged state where the first and second ends mutually engage each other to form a substantial seal across the split 28, and a disengaged state where the first and second ends can be moved apart to create an opening of a variable size and shape to enable the washer to be fitted about a cable gland (shown in FIG. 2). The joint structure 40 has a first locking mechanism 42 and a second locking mechanism 44. Each locking mechanism has respective parts on the first and second ends 30, 32. The respective first and second parts of the second locking mechanism 44 are only engageable after the first and second parts of the first locking mechanism 42 are fully engaged.

Figure 7:
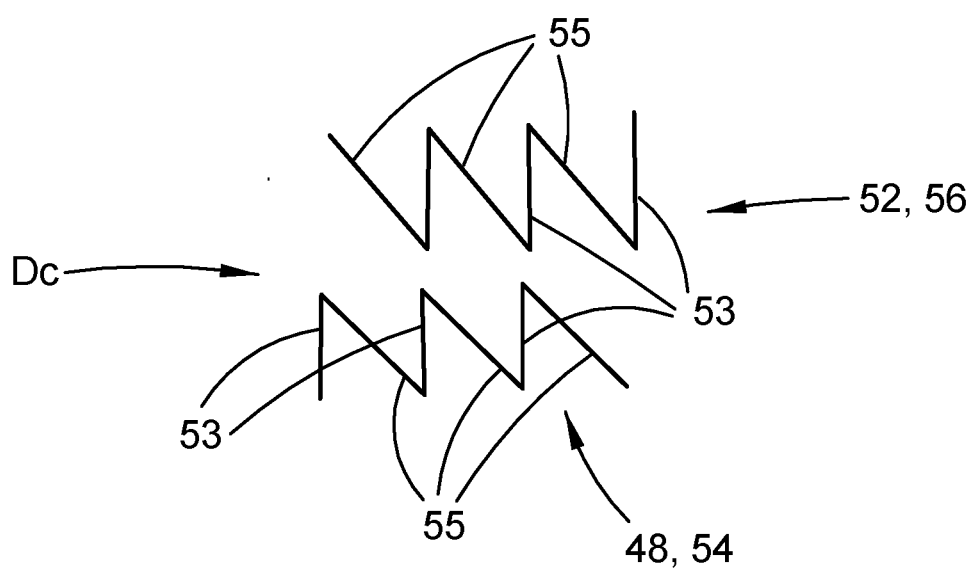
FIG. 7 is a schematic representation of teeth incorporated in the first locking mechanism.

The first part 46 of the first locking mechanism 42 comprises at least one, but in the illustrated embodiment, a plurality of engaging portions, in the form of teeth 48. The second part 50 of the first locking mechanism 42 comprises at least one, but in the illustrated embodiment, a plurality of complementary engaging portions in the form of teeth 52. The teeth 48, 52 are of a sawtooth like configuration having a generally radially extending edge 53 and a raked or inclined edge 55 (see FIG. 7). The edge 55 is raked or inclined in a direction to facilitate closing of the joint mechanism 40 when the ends 30 and 32 are pushed together.

Figure 3:
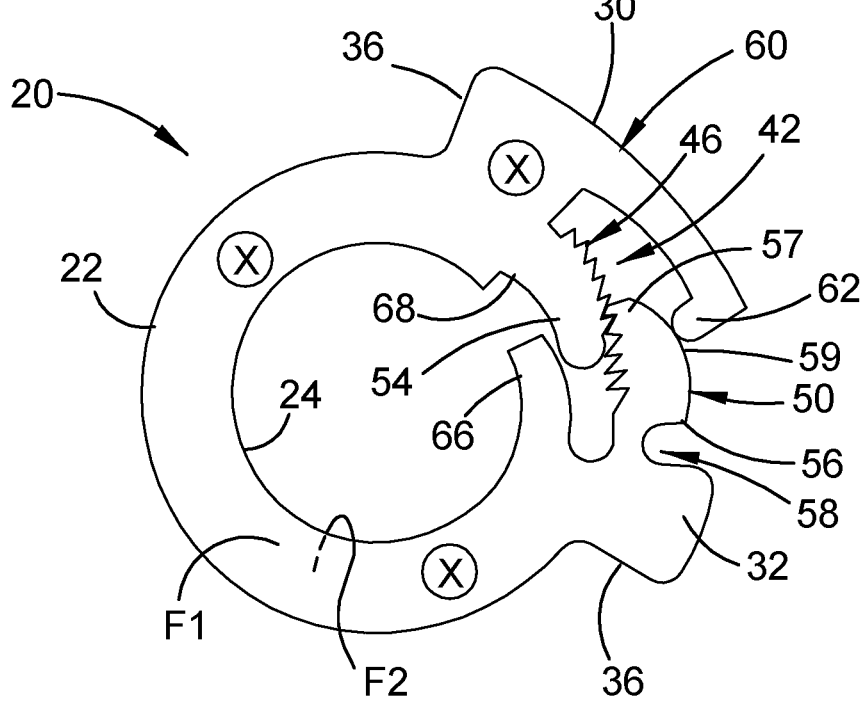
FIG. 3 is a representation of the embodiment of the disclosed washer shown in FIG. 2 in a disengaged state prior to application of force to commence engagement and closing of the washer.

Referring to FIG. 3, the teeth 48 are formed on a first finger 54 that extends circumferentially from the first end 30. The teeth 52 are formed on a second finger 56 that extends circumferentially from the second end 32. The finger 56 is formed with a ramp 57 at its free end. The ramp 57 leads to a curved surface 59 on the radial outer side of the finger 56. When the washer 20 is being moved to the engaged state, the second finger 56 passes over the first finger 54 and their respective teeth 48 and 52 engage each other.

Figure 6:
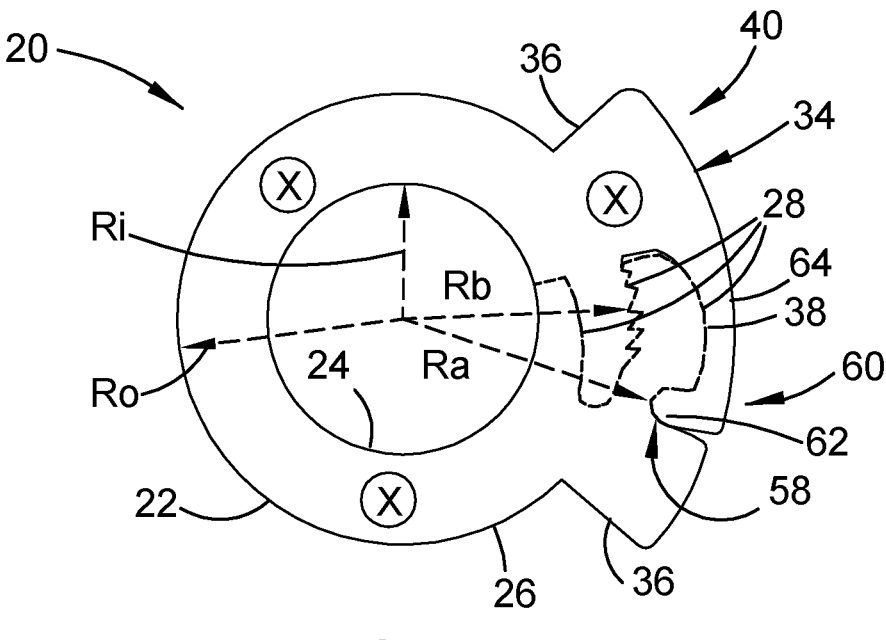
FIG. 6 is a photograph of the embodiment of the disclosed washer shown in FIG. 2-5 in a fully engaged and closed state where both the first and second locking mechanisms are fully engaged.

The first part 58 of the second locking mechanism 44 is carried by the second part 50 of the first locking mechanism 42. In another way of looking at this, the first part 58 of the second locking mechanism 44 can be viewed as being carried, or formed on, the second finger 56 or more broadly on the second end 32. The first part 58 is a recess formed on the first locking mechanism 42/second end 32. The recess has a smoothly curved concave shape. As shown in FIG. 6 the first part 58 has a deepest point located on a radius Ra of the washer 20. This radius extends past a maximum radius Rb of the first and second parts of the first locking mechanism 42. The radius Rb may be the same as the radius Ro.

The second part 60 of the second locking mechanism 44 is carried by or otherwise formed on the first end 30. Also, the second part 60 extends above or over the first locking mechanism 42. The second part 60 comprises a protrusion 62 that extends in a generally radial inward direction from a finger 64. When the first locking mechanism 42 is fully engaged the first and second parts 58, 60 of the second locking mechanism can engage each other by virtue of the protrusion 62 locating within the recess/first part 58, as shown in FIG. 6.

The washer 20 has opposite planar (i.e., flat) radial faces F1, F2. That is, when the washer 20 is not being twisted for example in order to fit over a cable gland or other member, it has no parts that extend in the axial direction beyond its planar faces F1 and F2. When the washer 20 is fitted and fully engaged it is able to lie between two opposed planar surfaces, such as a flange on a nut 18 and a wall 14 of a junction box. These surfaces can be brought together for example by screwing up nut 18. Consequently, there is face-to-face contact of the planar faces F1 and F2 of the washer 20 with the nut 18 and wall 14 respectively, at least when the nut 18 is tightened. The tightening compresses the washer 20 and is in a direction which urges the ends 30 and 32 toward each other enhancing the engagement of first and second locking mechanisms 42, 44. In this embodiment there are no parts of the washer 20 that extend axially from either face F1 or F2.

The washer 20 also has a finger 66 that is arranged to seat within a shoulder 68. The finger 66 and shoulder 68 are formed on a radial inner side of the washer 20. When the washer 20 is closed and fully engaged the finger 66 sits in the shoulder 68 beneath the finger 54. A leading end of the finger 66 has a taper 69 on its upper surface to reduce its radial extent. This creates a small ramp making easier for the finger 54 to move into the gap between the fingers 56 and 66. The shoulder 68 is widened slightly near its root to mate closely with the taper 69 when the washer 20 is fully engaged.

It will also be recognised that the split 28 configures the joint structure 40 as opposing pairs of circumferentially extending and radially spaced fingers. This is manifested by each of the ends 30 and 32, which together form the joint structure 40, being in the general form of two circumferentially extending fingers which are radially spaced to form a gap between them. The gap is through the whole thickness of the washer. The ends 30, 32 are arranged so that both fingers of any one end receive one finger of the other end between them. Stated another way, one finger of each end fits between two fingers of the other end. The end 30 has the fingers 54 and 64, while the end 32 has the fingers 56 and 66. When the washer 20 is fully engaged the finger 54 of the end 30 fits into the gap between the fingers 56 and 66 of the second end 32. Similarly, the finger 56 of the end 32 fits into the gap between the fingers 64 and 54 of the second end 32. Each of the fingers 54, 64, 56 and 66 is of the same thickness as the remainder of the washer.

The method of use and operation of the washer 20 will now be described.

To fit the washer 20 to a cable gland 10 the joint structure 40 is disengaged. This may be achieved by twisting one end 30 relative to the other end 32 as shown in FIG. 2. This creates an opening between the ends 30 and 32. The size of the opening can be increased by pulling the ends 30 and 32 further part.

The opened and disengaged washer 20 can now be manipulated by pulling apart and/or or twisting the ends 30 and 32 to fit the washer 20 in a generally radial direction over the cable gland 10. If the washer 20 is then released, and in the absence of any other external force acting on the washer 20, the resilience of the washer 20 will cause it to assume a position (or similar thereto) as shown in FIG. 3 in which the first and second ends 30 and 32 abut each other, and the protrusion 60 has moved up the ramp 57. In this position there is no locking effect provided by the first and second parts 46 and 50 of the first locking mechanism 42. This is because there has been no engagement of the teeth 48 with the teeth 52. Also, the second locking mechanism 44 is disengaged, with the protrusion 62 being circumferentially spaced from the recess 58. At this stage the finger 66 is moved toward the shoulder 68 beneath the finger 54.

To close and engage the washer 20, a user applies pressure to the ends 30 and 32 to push or squeezing them together.

Figure 4:
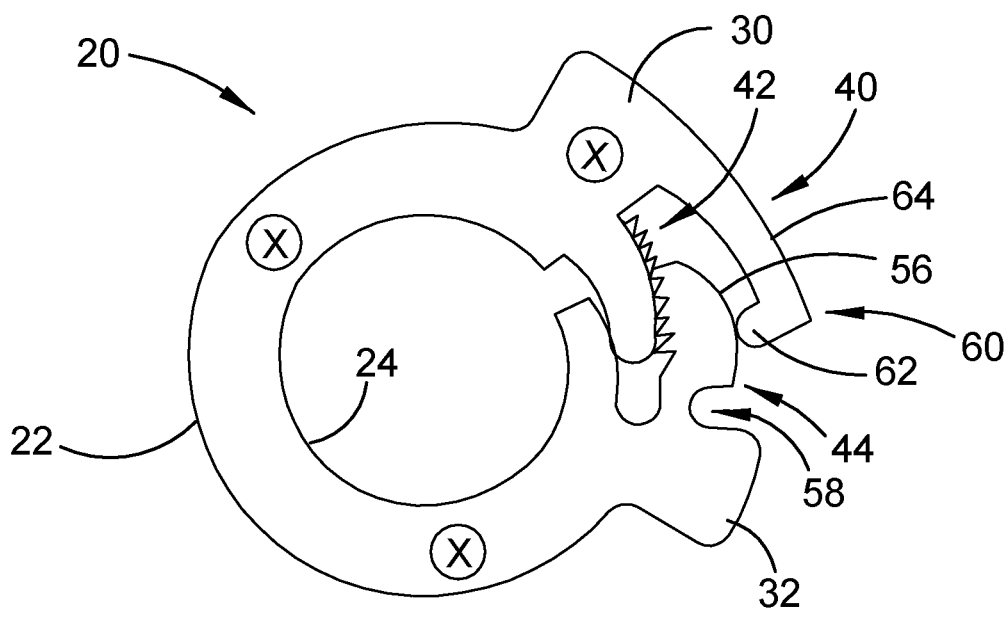
FIG. 4 is a representation of the embodiment of the disclosed washer shown in FIGS. 2 and 3 with a first locking mechanism shown in a partially engaged configuration and a second locking mechanism being disengaged.

This can be done by hand with a thumb and finger pushing inwardly on the edges 36 and 38. When this occurs the first locking mechanism 42 commences to engage by the teeth 48 and 52 "clicking" over each other in a ratchet like manner. Simultaneously the second part 60 of the second locking mechanism 44 is moved circumferentially toward the first part 58. More specifically the protrusion 62 rides along the curved outer surface of the finger 56 toward the recess 58. The finger 66 also moves further toward and into the shoulder 68, simultaneously increasing the degree of overlap with the first finger 54. This stage of the closing process is shown in FIG. 4.

Figure 5:
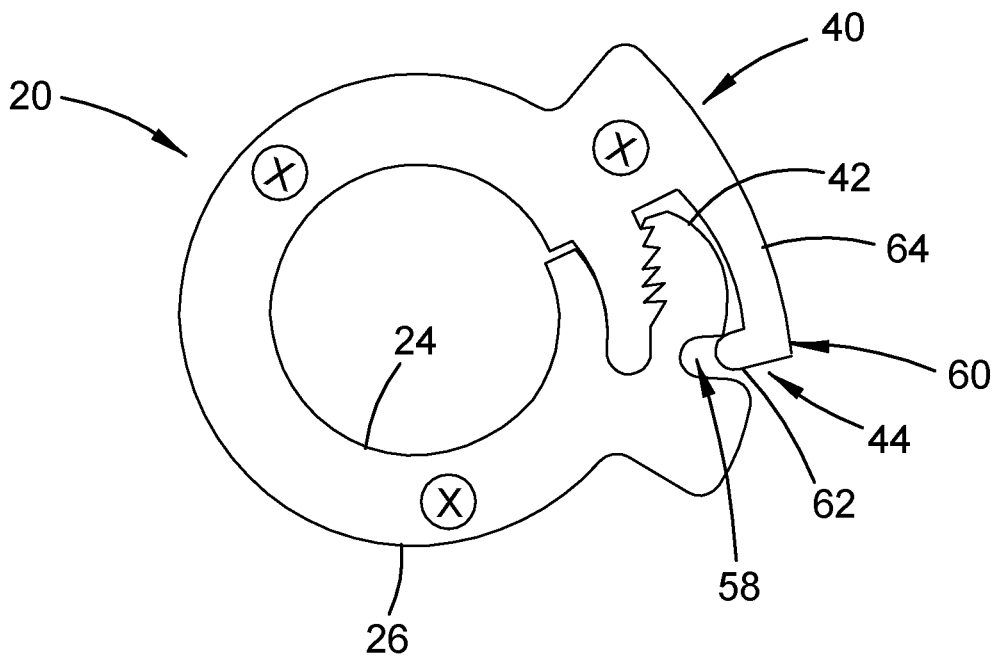
FIG. 5 is a representation of the embodiment of the disclosed washer shown in FIGS. 2, 3 and 4 in a further advanced stage of closing in which the first locking mechanism is fully engaged and the second locking mechanism is partially engaged.

As shown in FIG. 5 by continuing to apply this pressure the first locking mechanism 42 becomes fully engaged. This is denoted by a forward most of the teeth 52 on the second finger 56 overhanging an inner most of the teeth 48 on the first finger 54. Also, the first and second parts 58, 62 of the second locking mechanism 44 are now substantially radially aligned with each other. However, at this stage they are not fully engaged. Rather the arm 64 abuts second finger 56. This occurs on a region where the ramp 57 meets the curved surface 59. As result of this abutment the finger 64 holds the protrusion 62 at least partially out of the recess 58. This would be generally visible to an installer of the washer 20 thereby giving visual feedback that the engagement enclosure of the washer 20 is not yet complete. In addition, the finger 66 is now fully seated in the shoulder 68.

To complete the engagement and closure of the washer 20 the protrusion 62 of the second locking mechanism 44 is now pushed in a radial inward direction to seat to the maximum extent into the first part/recess 58. This action also assists in compressing the first and second parts 46 and 50 of the first locking mechanism 42 against each other.

It should be appreciated from the above that the action in closing the washer 20/joint mechanism 40, with the teeth 48 and 52 passing over each other provides the installer with physical sensory (haptic) feedback that the closing and engagement of the washer 20 has occurred. This physical sensory feedback is also provided by the is protrusion 62 fitting into the recess 58. Also, as previously mentioned there is visual feedback provided by the juxtaposition and angle of the finger 64 as well as the seating of the protrusion 62 in the recess 58 of the completion of the engagement process.

The washer 20 also has a directionality in that it is arranged to be installed so that the rotational direction of the application of torque on a nut or other fastener which applies a clamping force on the radial faces F1 and F2 of the washer 20 tends to assist in forming a seal between the outer peripheral edge and the inner circumferential edge. Looking at FIG. 6 when the end 30 is on the right-hand side of the tab 34, the closing direction Dc of the washer 20 from the view point of the teeth 48 is to the right, coinciding with a clockwise tightening direction of the nut 18. Prior to tightening the nut 18 the teeth 48, 52 would be fully engaged and the protrusion 62 would be in the recess 58. The end 32 is prevented from moving away from the end 30 during tightening by at least the seating of protrusion 62 in the recess 58. During tightening, friction applied to the washer 20 by the nut 18 would tend to increase to contact pressure (a) between the teeth 48, 52 due the angle of the raked edges 55; and (b) of the finger 66 against the shoulder 68. The increase in contact pressure between these surfaces is believed to provide an improved sealing effect.

To take advantage of this improved sealing, and with reference to FIG. 3, assuming that a direction of tightening of a fastener (for example nut 18 of FIG. 1) is to the right (e.g., clockwise direction) then the washer 20 should be orientated so that the end 30 of the tab 34 should ideally be on the left side when viewed in a direction down the cable 10 from the gland 12 toward the wall 14. To assist an installer to apply the washer with this orientation an indicia, such as one or more painted/printed crosses X can be provided on face F1 which would face the installer (i.e., be on a side facing away from the wall 14) when the washer 20 is fitted.

Embodiments of the washer 20 may be made from flexible and resilient materials such as but not limited to: natural rubber and synthetic rubber including thermoplastic elastomers such as that available under the brand name Santoprene®. Embodiments of the washer 20 which may be particularly well suited to use with junction boxes of the type found on processing plant and installations such as LNG plants may come in is a range of inner diameter is from 20 mm-55+ mm, and thicknesses from 2 mm-4 mm.

The above method of use of the washer 20 can be applied in relation to a junction box or other devices where an electrical conductor is mechanically coupled to a connection block or other equipment without the need to mechanically disconnect the electrical conductor.

For example, referring back to FIG. 1, assume that the washer 16 is a split washer, or is made of material can be relatively easily cut or otherwise broken away from the junction box or cable gland 12. The steps to install a fresh washer 20 may comprise the following steps:

unscrew the threaded end 13 of the cable gland 12 from the junction box wall 14 several turns (e.g., 1-3 revolutions) to create a small gap between the wall 14 and a planar face of the nut 18; the gap only needs to be several (e.g., 1-4) millimetres wider than the thickness of the washer 20, so the cable gland is loosened but not disengaged from the junction box wall;

if the washer 16 is a split washer, open the washer and remove it from about the nut 18 and cable 10, or if the washer 16 is not a split washer but can be cut or broken away from the nut 18/cable 10 then do so;

manipulate a washer 20 so that it is in the disengaged state as shown for example in FIG. 2;

preferably orientated the washer 20 so that the end 30 is on the left-hand side of the tab 34 when viewed in a direction from the gland 12 toward the wall 14;

insert the washer 20 in a generally radial direction onto the cable gland 18/cable 10 in the gap between the wall 14 in the planar face of the cable gland 18;

apply a force to bring the ends 30 and 32 toward each other and cause the teeth 48 and 52 to progressively engage as the fingers 54 and 56 over each other;

upon full engagement of the teeth 48 and 52, with the protrusion 62 in radial alignment with the recess 58, apply pressure to the finger 64 to insert the protrusion 62 into the recess 58;

tighten the nut 18.

As will be recognised in the above method of use of the washer 20 is not necessary to disconnect the cable 10 or fully unscrew the gland 12/nut 18 from the junction box bracket or other termination).

Any discussion of the background art throughout this specification should in no way be considered as an admission that such background art is prior art, nor that such background art is widely known or forms part of the common general knowledge in the field in Australia or worldwide.

In the claims which follow and in the preceding description, except where the context requires otherwise due to express language or necessary implication, the word "comprise" and variations such as "comprises" or "comprising" are used in an inclusive sense, i.e. to specify the presence of the stated features but not to preclude the presence or addition of further features of the embodiments as disclosed herein.

What is claimed:

1. A unitary piece dual lock split washer comprising:
a single piece body made of a resilient and flexible material, the body having an inner circumferential edge, a radially outer peripheral edge and a split extending between the inner and outer edges to provide the body with first and second ends; and
a joint structure integrally formed with the first and second ends, the joint structure having an engaged state wherein the first and second ends mutually engage each other to form a substantial seal across the split, and a disengaged state wherein the first and second ends can be moved apart to create an opening of a variable size and shape in the body to enable the washer to be fitted about a member, the joint structure having a first locking mechanism and a second locking mechanism each locking mechanism having respective parts on the first and second ends and wherein the parts of the second locking mechanism are only engageable after the parts of the first locking mechanism are fully engaged;
wherein the joint structure includes: first and second fingers radially spaced by a first gap and extending circumferentially from the first end; and, first and second fingers radially spaced by a second gap and extending circumferentially from the second end wherein when in the engaged state one finger of each end fits in the gap between the two fingers of the other end.

2. The split washer according to claim 1, wherein the first locking mechanism has a first part on the first finger extending from the first end and a second part on the second finger extending from the second end.

3. The split washer according to claim 2, wherein a first part of the second locking mechanism is carried on the second finger extending from the second end.

4. The split washer according to claim 3, wherein a second part of the second locking mechanism is on the second finger extending from the first end.

5. The split washer according to claim 1, wherein one of a first part and a second part of the second locking mechanism comprises a protrusion extending in a generally radial direction and another of the first part and the second part of the second locking mechanism is a recess for receiving the protrusion.

6. The split washer according to claim 5, wherein the second part of the second locking mechanism is the protrusion and the protrusion is on the second finger extending from the first end.

7. The split washer according to claim 6, wherein the protrusion is arranged to:
bear against the first finger extending from the second end and flex in a generally radial outward direction prior to the first locking mechanism becoming fully engaged while the first and second ends are being moved toward each other; and,
be in radial alignment with the second part of the second locking mechanism wherein the second finger extending from the first end is capable of flexing in a generally radial inward direction to engage with the second part of the second locking mechanism when the first locking mechanism is fully engaged.

8. The split washer according to claim 5, wherein the first part of the second locking mechanism comprises a recess formed in the second end.

9. The split washer according to claim 1, wherein the first part of the first locking mechanism comprises at least one engaging portion, and the second part of the first locking mechanism comprises at least one complementary engaging portion.

10. The split washer according to claim 9, wherein the least one engaging portion comprises a first plurality of teeth, and each of the at least one complementary engaging portion comprises a second plurality of teeth.

11. The split washer according to claim 1, wherein when the first and second locking mechanism are engaged, the inner circumferential edge has a substantially constant radius $R_i$ and the radially outer peripheral edge has a compound shape of a portion of a circle and a radially extending tab having opposite radial edges which reach to an arcuate edge.

12. The split washer according to claim 11, wherein the split follows a winding path through the tab from the inner circumferential edge to the arcuate edge of the tab.

13. The split washer according to claim 11, wherein the portion of the circle of the radially outer peripheral edge extends with a constant radius $R_o$ for between about 260°-300°, and the tab extends circumferentially for between about 60°-100°.

14. The split washer according to claim 1, where in the body is made from a natural or synthetic rubber including a thermoplastic elastomer.

15. An electrical configuration comprising:
a junction box;
a gland including an end that secures to a wall of the junction box;
a cable including an end that extends through the gland and beyond the end of the gland that secures to the wall of the junction box so as to extend within the junction box; and
the split washer of claim 1, wherein the split washer is disposed between a portion of the gland and the wall of the junction box.

16. A unitary piece dual lock split washer comprising:
a single piece body made of a resilient and flexible material, the body having an inner circumferential edge, a radially outer peripheral edge and a split extending between the inner and outer edges to provide the body with first and second ends; and
a joint structure integrally formed with the first and second ends, the joint structure having an engaged state wherein the first and second ends mutually engage each other to form a substantial seal across the split, and a disengaged state wherein the first and second ends can be moved apart to create an opening of a variable size and shape in the body to enable the washer to be fitted about a member, the joint structure having a first locking mechanism and a second locking mechanism each locking mechanism having respective parts on the first and second ends and wherein the parts of the second locking mechanism are only engageable after the parts of the first locking mechanism are fully engaged;
wherein:
the joint structure includes first and second fingers radially spaced by a first gap and extending circumferentially from the first end, and first and second fingers radially spaced by a second gap and extending circum-ferentially from the second end wherein when in the engaged state one finger of each end fits in the gap between the two fingers of the other end; and one of a first part and second part of the second locking mechanism is a protrusion extending in a generally radial direction and another of the first part and second part of the second locking mechanism is a recess for receiving the protrusion.

17. A unitary piece dual lock split washer comprising:

a single piece body made of a resilient and flexible material, the body having an inner circumferential edge, a radially outer peripheral edge and a split extending between the inner and outer edges to provide the body with first and second ends; and a joint structure integrally formed with the first and second ends, the joint structure having an engaged state wherein the first and second ends mutually engage each other to form a substantial seal across the split, and a disengaged state wherein the first and second ends can be moved apart to create an opening of a variable size and shape in the body to enable the washer to be fitted about a member, the joint structure having a first locking mechanism and a second locking mechanism each locking mechanism having respective parts on the first and second ends and wherein the parts of the second locking mechanism are only engageable after the parts of the first locking mechanism are fully engaged;

wherein:

the first locking mechanism has a first part on the first finger extending from the first end and a second part on the second finger extending from the second end;

a first part of the second locking mechanism is carried on the second finger extending from the second end;

a second part of the second locking mechanism is on the second finger extending from the first end; and one of the first part and the second part of the second locking mechanism is a protrusion extending in a generally radial direction and another of the first part and second part of the second locking mechanism is a recess for receiving the protrusion.

* * * * *